US012779827B2

(12) United States Patent
Kono

(10) Patent No.: US 12,779,827 B2
(45) Date of Patent: Nov. 3, 2026

(54) FLOOR FINISHING MATERIAL

(71) Applicant: LONSEAL CORPORATION, Tokyo (JP)

(72) Inventor: Haruhiko Kono, Tsuchiura (JP)

(73) Assignee: LONSEAL CORPORATION, Tokyo (JP)

( * ) Notice: Subject to any disclaimer, the term of this patent is extended or adjusted under 35 U.S.C. 154(b) by 353 days.

(21) Appl. No.: 17/439,683

(22) PCT Filed: Mar. 12, 2020

(86) PCT No.: PCT/JP2020/010957
§ 371 (c)(1),
(2) Date: Sep. 15, 2021

(87) PCT Pub. No.: WO2020/189531
PCT Pub. Date: Sep. 24, 2020

(65) Prior Publication Data

US 2022/0161531 A1 May 26, 2022

(30) Foreign Application Priority Data

Mar. 15, 2019 (JP) ................................ 2019-048289

(51) Int. Cl.
*B32B 27/12* (2006.01)
*B32B 5/02* (2006.01)
(Continued)

(52) U.S. Cl.
CPC .............. *B32B 27/12* (2013.01); *B32B 5/024* (2013.01); *B32B 7/12* (2013.01); *B32B 27/08* (2013.01);
(Continued)

(58) Field of Classification Search
CPC ........... B32B 27/12; B32B 5/024; B32B 7/12; B32B 27/08; B32B 27/20; B32B 27/22;
(Continued)

(56) References Cited

U.S. PATENT DOCUMENTS 6,093,473 A 7/2000 Min
2016/0257395 A1 9/2016 Cinausero et al.
(Continued)

FOREIGN PATENT DOCUMENTS

CN 1256200 A 6/2000
CN 1420025 A 5/2003
(Continued)

OTHER PUBLICATIONS

International Search Report, mailed Jun. 9, 2020, for International Application No. PTC/JP2020/010957, 6 pages. (with English Translation).
(Continued)

*Primary Examiner* — Matthew D Matzek
(74) *Attorney, Agent, or Firm* — Seed Intellectual Property Law Group, LLP

(57) ABSTRACT

The present invention provides a floor finishing material includes: a reinforcing layer, a base material layer and a surface layer, in which the reinforcing layer contains woven fabric or nonwoven fabric impregnated with a synthetic resin, and the base material layer and the surface layer contain a polyvinyl chloride-based resin composition.

13 Claims, 1 Drawing Sheet

(51) Int. Cl.

| | |
|---|---|
| ***B32B 7/12*** | (2006.01) |
| ***B32B 27/08*** | (2006.01) |
| ***B32B 27/20*** | (2006.01) |
| ***B32B 27/22*** | (2006.01) |
| ***B32B 27/30*** | (2006.01) |
| ***B64C 1/18*** | (2006.01) |
| ***E04F 15/16*** | (2006.01) |
| *B60N 3/04* | (2006.01) |

(52) U.S. Cl.
CPC .............. *B32B 27/20* (2013.01); *B32B 27/22* (2013.01); *B32B 27/304* (2013.01); *B64C 1/18* (2013.01); *E04F 15/16* (2013.01); *B32B 2260/021* (2013.01); *B32B 2260/046* (2013.01); *B32B 2262/101* (2013.01); *B32B 2307/3065* (2013.01); *B32B 2307/718* (2013.01); *B32B 2307/732* (2013.01); *B32B 2419/00* (2013.01); *B60N 3/04* (2013.01)

(58) Field of Classification Search
CPC ............ B32B 27/304; B32B 2260/021; B32B 2260/046; B32B 2262/101; B32B 2307/3065; B32B 2307/718; B32B 2307/732; B32B 2419/00; B32B 2255/02; B32B 5/022; B32B 2262/0276; B32B 2255/26; B32B 2262/106; B32B 2307/546; B32B 2471/00; B32B 2605/00; B32B 2605/18; B60N 3/04; B60N 3/048; E04F 15/105; E04F 15/107; E04F 15/16; B64C 1/18
USPC .................................................. 442/179, 180
See application file for complete search history.

(56) References Cited

U.S. PATENT DOCUMENTS

| | | | |
|---|---|---|---|
| 2017/0356130 A1* | 12/2017 | Guyot | B32B 5/245 |
| 2018/0058078 A1 | 3/2018 | Kwon et al. | |
| 2019/0046991 A1 | 2/2019 | Krampe et al. | |
| 2019/0263307 A1* | 8/2019 | Jaudouin | D06N 7/0049 |
| 2019/0275761 A1* | 9/2019 | Feys | B41M 7/0081 |

FOREIGN PATENT DOCUMENTS

| | | | |
|---|---|---|---|
| CN | 103827414 | A | 5/2014 |
| CN | 106010151 | A | 10/2016 |
| CN | 107250469 | A | 10/2017 |
| EP | 0083220 | A2 * | 12/1982 |
| JP | 5-163824 | A | 6/1993 |
| JP | 2001-519256 | A | 10/2001 |
| JP | 2001-323646 | A | 11/2001 |
| JP | 2002081197 | A | 3/2002 |
| JP | 2007-77763 | A | 3/2007 |
| JP | 2013189607 | A * | 9/2013 |
| JP | 2014117850 | A * | 6/2014 |
| JP | 2015063089 | A | 4/2015 |
| JP | 2016-163995 | A | 9/2016 |
| JP | 2017-20248 | A | 1/2017 |
| JP | 2018-44340 | A | 3/2018 |
| JP | 2018-62181 | A | 4/2018 |
| JP | 2019-48289 | A | 3/2019 |
| WO | WO 2016113378 | A1 | 7/2016 |

OTHER PUBLICATIONS

Chinese Office Action, issued Jul. 27, 2023, for Chinese Patent Application No. 202080021479.0. (22 pages) (with English translation).

Chinese Office Action, dated Nov. 3, 2022, for Chinese Application No. 1 202080021479.0. (19 pages) (with English translation).

Extended European Search Report, dated Nov. 11, 2022, for European Application No. 20773504.4. (9 pages).

Chinese Office Action, issued Apr. 25, 2023, for Chinese Patent Application No. 202080021479.0. (19 pages) (with English translation).

Japanese Office Action, issued Dec. 19, 2023, for Japanese Patent Application No. 2021-502294 (12 pages) (with English translation).

Office Action, with English Translation, dated May 7, 2024, for Japanese Patent Application No. 2021-507294. (12 pages).

Office Action, dated Oct. 29, 2024, for Japanese Patent Application No. 2021-507294. (10 pages) (with English translation).

Office Action, dated Oct. 23, 2025, for European Patent Application No. 20773504.4 (5 pages).

Office Action, dated Apr. 16, 2026, for Chinese Patent Application No. 202080021479.0. (11 pages)(with English Translation).

Office Action, dated May 25, 2026, for Chinese Patent Application No. 202080021479.0. (15 pages)(with English Translation).

* cited by examiner

FLOOR FINISHING MATERIAL

TECHNICAL FIELD

The present invention relates to a floor finishing material that is intended to be used as a finishing material for a floor in a vehicle that transports people such as an aircraft.

BACKGROUND ART

For a floor finishing material for a vehicle or an aircraft, using lightweight materials while maintaining good physical properties results in an improved fuel efficiency and reduced operating costs.

In general, the floor finishing material is formed of a plurality of layers that are combined together. In particular, the floor finishing material for the aircraft needs to have a certain degree of rigidity in order to limit deformation that may occur during flight, a formation of mixed air bubbles on a back of a finishing material, and the like, and thus can be composed of a reinforcing layer that ensures a rigidity of a product. As such a floor finishing material, a multi-layer floor finishing material with two reinforcing layers is disclosed: a layer of reinforcing fibers and a reinforcing layer that is free of reinforcing fibers and is made of thermoplastic polymer which is a polyester resin, an acrylic resin, or a mixture thereof (Patent Literature 1).

However, since this multi-layer floor finishing material is formed by stacking a plurality of different types of resin layers, a manufacturing process is complicated.

CITATION LIST

Patent Literature

Patent Literature 1: JP-A-2016-163995

SUMMARY OF INVENTION

Technical Problem

An object of the present invention is to provide a floor finishing material which is rigid enough to withstand impact and deformation, is lightweight, and can be easily manufactured.

Solution to Problem

Measures used by the present invention to solve the above problems are as follows.

[1]

A floor finishing material includes: a reinforcing layer, a base material layer, and a surface layer, in which the reinforcing layer contains woven fabric or nonwoven fabric impregnated with a synthetic resin, and the base material layer and the surface layer contain a polyvinyl chloride-based resin composition.

[2]

The floor finishing material according to [1], which has a bending rigidity as measured in accordance with JIS K7106 of 50 MPa or more.

[3]

The floor finishing material according to [1] or [2], which has a weight of 1000 $g/m^2$ or more and 2300 $g/m^2$ or less.

[4]

The floor finishing material according to any one of [1] to [3], in which the base material layer and the surface layer contain a plasticizer.

[5]

The floor finishing material according to [4], in which the plasticizer is a polyester-based plasticizer.

[6]

The floor finishing material according to any one of [1] to [5], further includes: a second reinforcing layer made of nonwoven fabric or woven fabric.

[7]

The floor finishing material according to any one of [1] to [6], in which a result of a combustion smoke test (Ds (max)) as measured in accordance with ASTM E662 is 200 or less, and a result of a combustion toxic gas test (HCl (ppm)) as measured in accordance with ASTM E662 is 150 or less.

[8]

The floor finishing material according to any one of [1] to [7], in which the reinforcing layer contains the woven fabric impregnated with the synthetic resin.

[9]

The floor finishing material according to [8], in which the woven fabric contains glass or carbon.

[10]

The floor finishing material according to [8] or [9], in which a tex of a yarn used for the woven fabric is 30 g/1000 m to 300 g/1000 m, and a weaving density of the woven fabric is 10 yarns/25 mm to 30 yarns/25 mm.

[11]

The floor finishing material according to any one of [1] to [10], in which the synthetic resin is a thermosetting resin.

[12]

The floor finishing material according to any one of [1] to [11], in which an impregnation amount of the synthetic resin in the reinforcing layer is 20 $g/m^2$ to 60 $g/m^2$.

Advantageous Effects of Invention

The floor finishing material of the present invention has appropriate rigidity, is lightweight, and has an uncomplicated layer structure, so that it is possible to provide a floor finishing material that can be easily manufactured.

Since a resin layer is composed of two layers, the base material layer and the surface layer, both of which are made of the polyvinyl chloride-based resin composition, the number of processes required for manufacture is reduced, and an easy manufacture becomes possible.

DESCRIPTION OF EMBODIMENTS

Hereinafter, embodiments of the present invention will be described in detail. A floor finishing material of the present invention at least includes a reinforcing layer, a base material layer, and a surface layer. The reinforcing layer, the base material layer, and the surface layer are stacked and integrated to configure the floor finishing material.

The floor finishing material of the present invention is lightweight and has an appropriate rigidity, and is suitable as a floor finishing material for a vehicle such as an aircraft. In addition, as the floor finishing material for such applications, a flame resistance, a reduction of an amount of smoke or a generated amount of toxic gas generated at the time of combustion, and the like are also taken into consideration.

Each configuration of the floor finishing material of the present invention will be described.

Figure 1:
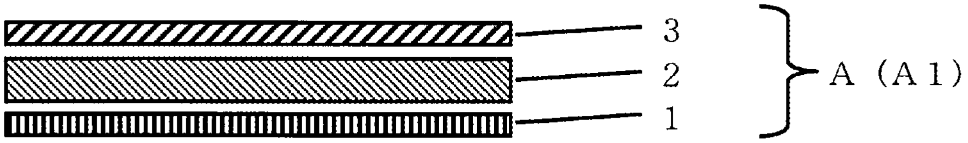
FIG. 1 is a cross-sectional view of a floor finishing material according to an embodiment of the present invention.

FIG. 1 shows an embodiment of the floor finishing material of the present invention.

A reinforcing layer 1 is composed of a composite material containing woven fabric or nonwoven fabric and thermosetting or thermoplastic synthetic resin. The reinforcing layer 1 is formed by impregnating the woven fabric or the nonwoven fabric with a synthetic resin, and provides sufficient rigidity to the floor finishing material.

The woven fabric or the nonwoven fabric of the reinforcing layer 1 is made of a natural fiber or a synthetic fiber, which are an inorganic or organic substance. Preferred examples thereof include fibers selected from a group consisting of glass, carbon, aramid, polyethylene, zylon, nylon, polyester, acrylic, vinylon, linen, cotton, hemp, and the like. Among the examples, glass and carbon are more preferable.

Examples of the synthetic resin of the reinforcing layer 1 include thermosetting or thermoplastic synthetic resins selected from a group consisting of a polyester resin, a phenol resin, an epoxy resin, a polysulfone resin, a vinyl ester resin, an acrylic resin, a polyamide resin, a polycarbonate resin, and a mixture thereof. Among the examples, a thermosetting resin is preferable, and an unsaturated polyester resin, a phenol resin, an epoxy resin, or the like is more preferable.

A thickness of the reinforcing layer 1 is preferably from 0.2 mm to 0.4 mm. When the thickness is 0.2 mm or more, sufficient bending rigidity is obtained, and when the thickness is 0.4 mm or less, it becomes easy to prevent an increase in manufacturing difficulty due to an increase in weight and a decrease in flexibility. A weight of the reinforcing layer 1 is preferably 200 g/m$^2$ to 400 g/m$^2$.

It is preferable that the reinforcing layer 1 is disposed at a bottom layer of the floor finishing material as in a floor finishing material A (floor finishing material A1) of FIG. 1. When the floor finishing material A is laid on a floor of the aircraft, the reinforcing layer is attached to a floor structure of a main body of the aircraft by a tackiness agent, an adhesive, or the like.

The reinforcing layer 1 is not particularly limited as long as the reinforcing layer 1 is composed of a composite material including the woven fabric or the nonwoven fabric and the thermosetting or thermoplastic synthetic resin, the woven fabric or the nonwoven fabric is impregnated with a synthetic resin, and the reinforcing layer 1 is in a solidified state. However, the woven fabric is preferably used because the woven fabric has an appropriate aperture and is also excellent in strength. It is possible to reduce the weight of the reinforcing layer 1 and prevent an increase in a weight of the floor finishing material A by setting an aperture of the composite material to an appropriate degree without being too small. Since appropriate flexibility can be imparted, a manufacturing process of the floor finishing material A is less likely to be limited.

The reinforcing layer 1 preferably contains a woven fabric impregnated with a synthetic resin. The woven fabric preferably contains glass or carbon.

The woven fabric is not particularly limited, but is preferably a plain weave.

Here, an aperture of the woven fabric depends on a tex of a yarn, a weaving density which is the number of yarns per unit length (25 mm) used for the woven fabric, and an amount of synthetic resin used. The tex of the yarn used for the woven fabric is preferably 30 g/1000 m to 300 g/1000 in, more preferably 50 g/1000 m to 200 g/1000 m, and further preferably 100 g/1000 in to 150 g/1000 m. The weaving density, which is the number of yarns per unit length (25 mm), is preferably 10 yarns/25 mm to 30 yarns/25 mm, and more preferably 15 yarns/25 mm to 25 yarns/25 mm. When a weaving density of a warp and a weaving density of a weft of the woven fabric are different, it is preferable that both the weaving density of the warp and the weaving density of the weft are in the above range.

It is preferable that the tex of the yarn used for the woven fabric is 30 g/1000 m to 300 g/1000 m, and the weaving density of the woven fabric is 10 yarns/25 mm to 30 yarns/25 mm.

Since an impregnation amount of the synthetic resin also affects flexibility and weight of the floor finishing material A, the impregnation amount of the synthetic resin in the reinforcing layer 1 is preferably 20 g/m$^2$ to 60 g/m$^2$, and more preferably 30 g/m$^2$ to 50 g/m$^2$.

A base material layer 2 and a surface layer 3 contain a polyvinyl chloride-based resin composition. Among general thermoplastic resins, a polyvinyl chloride-based resin has flame retardancy and is suitable as a material for the floor finishing material for the vehicle. The polyvinyl chloride-based resin composition forming the base material layer 2 and the surface layer 3 may contain a plasticizer for imparting appropriate flexibility.

Examples of the polyvinyl chloride-based resin used in the polyvinyl chloride-based resin composition include a polyvinyl chloride homopolymer resin, a chlorinated polyvinyl chloride resin, a polyvinyl chloride copolymer resin (such as a vinyl acetate-vinyl chloride copolymer and an ethylene-vinyl chloride copolymer), and a vinyl chloride graft copolymer (such as an ethylene-vinyl acetate-vinyl chloride graft copolymer and a polyurethane-vinyl chloride graft copolymer), which can be used alone or in combination of two or more.

Examples of the plasticizer used in the polyvinyl chloride-based resin composition include a phthalic acid ester-based plasticizer, a polyester-based plasticizer, a sulfonic acid ester-based plasticizer, a phosphoric acid ester-based plasticizer, an adipic acid ester-based plasticizer, and an epoxy-based plasticizer. Among these examples, a polyester-based plasticizer is preferable, and by using a polyester-based plasticizer which is a polycondensate of an aliphatic dibasic acid and a diol, it is possible to prevent the amount of smoke generated at the time of combustion.

Examples of the aliphatic dibasic acid of the polyester-based plasticizer include succinic acid, maleic acid, fumaric acid, glutamic acid, adipic acid, azelaic acid, sebacic acid, dodecanedicarboxylic acid, and the like. Examples of the diol include 1,2-propylene glycol, 1,2-butanediol, 1,3-butanediol, 2-methyl-1,3-propanediol, neopentyl glycol, 3-methyl-1,5-pentanediol, 2,2-diethyl-1,3-propanediol, 2,2,4-trimethyl-1,3-pentanediol, 2-ethyl-1,3-hexanediol, 2-butyl-2-ethyl-1,3-propanediol, 2-methyl-1,8-octanediol, and 1,12-octadecanediol.

Among these examples, an adipic acid-based polyester plasticizer is preferably used. This is because there are effects that a plasticizing efficiency is excellent and an amount of smoke generated at the time of combustion is small.

An amount of these plasticizers added is preferably 15 to 75 parts by weight, more preferably 25 to 65 parts by weight with respect to 100 parts by weight of the polyvinyl chloride-based resin for the base material layer 2, and an amount of these plasticizers added is preferably 10 to 60 parts by weight, more preferably 20 to 50 parts by weight with respect to 100 parts by weight of the polyvinyl chloride-based resin for the surface layer 3.

In addition to the plasticizer, an inorganic filler or a flame retardant can be added to the polyvinyl chloride-based resin composition of the base material layer 2.

Examples of the filler used in the polyvinyl chloride-based resin composition of the base material layer 2 include carbonates such as calcium carbonate and magnesium carbonate, layered silicates such as clay, talc, and mica, and hollow balloons such as fly ash balloons, shirasu balloons, and glass balloons. When the filler is added, there are effects that a dimensional stability and heat resistance are improved, and the amount of smoke and an amount of toxic gas such as HCl generated at the time of combustion are reduced, and a cost is reduced. In particular, it is preferable to add the calcium carbonate because the calcium carbonate has a higher effect in reducing the amount of toxic gas at the time of combustion and reducing costs.

An amount of the filler added is preferably 5 to 100 parts by weight, more preferably 25 to 80 parts by weight with respect to 100 parts by weight of the polyvinyl chloride-based resin.

Examples of the flame retardant used in the polyvinyl chloride-based resin composition of the base material layer 2 include inorganic materials such as a molybdic acid-based compound, a zinc stannate compound, a nitrogen-based compound such as ammonium carbonate and boron nitride, metal hydroxides such as magnesium hydroxide and aluminum hydroxide, and an antimony-based compound such as antimony oxide and organic materials such as a halogen-based compound such as a bromine-based compound and a phosphorus-based compound such as phosphoric acid ester. By employing the flame retardant, the flame retardancy is improved, the amount of smoke and the amount of toxic gas such as HCl generated at the time of combustion are reduced. In particular, since an effect of reducing the amount of smoke generated at the time of combustion is high, it is preferable to use the molybdic acid-based compound or the zinc stannate compound.

An amount of these flame retardants added is 5 to 100 parts by weight, and preferably 25 to 80 parts by weight with respect to 100 parts by weight of the polyvinyl chloride-based resin.

A thickness of the base material layer 2 is preferably from 0.5 mm to 1.1 mm, and more preferably from 0.6 mm to 1.0 mm. A weight of the base material layer 2 is preferably from 700 g/m$^2$ to 1550 g/m$^2$, and more preferably from 800 g/m$^2$ to 1450 g/m$^2$.

The surface layer 3 is disposed on an uppermost surface of the floor finishing material, and an upper surface of the surface layer 3 (a surface on a side opposite to a side of the base material layer 2) is exposed on a floor surface after construction. Therefore, it is desired to impart a design by coloring the polyvinyl chloride-based resin composition of the surface layer 3 by adding various pigments, or by providing a ruggedness on a surface by embossing or the like.

By imparting transparency to the surface layer 3 and printing a pattern, a decoration, or the like on a lower surface of the surface layer 3 (a surface on the side of the base material layer 2) or an upper surface of the base material layer 2 (a surface on a side of the surface layer 3), it is possible to provide a floor finishing material which has excellent design property and can protect the design from wear of the surface layer 3 which may occur by being used after construction on the floor surface.

When a resin of a layer on which a design is printed (in this case, the base material layer 2) and a resin of the surface layer 3 are different, if a material to be used for printing does not have good adhesion to both the resins, a peeling strength is lowered, so that a use of a primer is required, or a material used for printing is limited. However, if the resin used for both layers is the same, a choice of materials that can be used for printing is greatly increased.

A thickness of the surface layer 3 is preferably from 0.1 mm to 0.3 mm. A weight of the surface layer 3 is preferably 100 g/m$^2$ to 350 g/m$^2$.

If necessary, a stabilizer, a lubricant, an ultraviolet absorber, a pigment, a light stabilizer, an antioxidant, an antibacterial agent, a foaming agent, a filler, or the like may be added to the polyvinyl chloride-based resin composition of the base material layer 2 and the surface layer 3.

A thickness of the floor finishing material is preferably from 0.8 mm to 1.8 mm, and more preferably from 1.0 mm to 1.8 mm. A weight of the floor finishing material is preferably from 1000 g/m$^2$ to 2300 g/m$^2$, and more preferably from 1250 g/m$^2$ to 2300 g/m$^2$.

The floor finishing material preferably has a result of bending rigidity of 50 MPa or more, and more preferably 100 MPa or more, as measured in accordance with JIS K7106. When the bending rigidity is 50 MPa or more, sufficient bending rigidity can be obtained, and it becomes easy to prevent a deformation that may occur during flight and a formation of mixed air bubbles on a back of a finishing material in the floor finishing material for the aircraft. In a case where the bending rigidity described above is 500 MPa or less, when a long floor finishing material is used, it can be wrapped around a paper tube or the like and stored and transported in the form of a scroll, which facilitates handling during construction, and the bending rigidity is preferably 400 MPa or less.

Since it is difficult to evacuate from the vehicle and the aircraft in the event of a fire or the like during operation, it is desirable to have the flame retardancy and prevent the amount of smoke and the amount of toxic gas generated at the time of combustion. The similar applies to the floor finishing material, and specific performance is in accordance with a test method specified in ASTM E662, and it is preferable that both of the amount of smoke and a concentration of toxic gas (hydrogen chloride gas) generated in flame combustion and non-flame combustion are in the following ranges.

The amount of smoke (Ds (max)) is preferably 200 or less, and more preferably 150 or less. The concentration of toxic gas (hydrogen chloride gas) (HCl (ppm)) is preferably 150 ppm or less, and more preferably 100 ppm or less.

Figure 2:
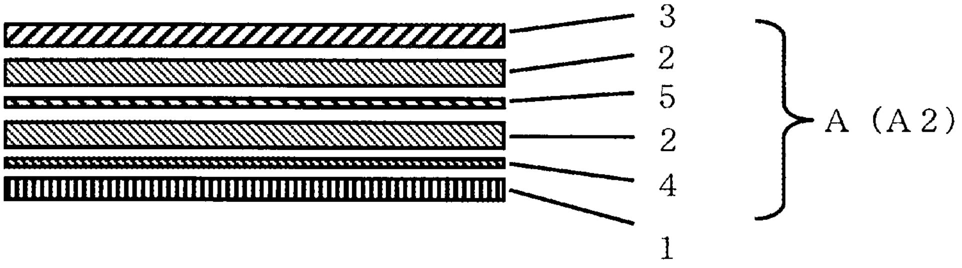
FIG. 2 is a cross-sectional view of a floor finishing material according to another embodiment of the present invention.

In addition to the reinforcing layer 1, the base material layer 2, and the surface layer 3, an adhesive layer 4 and a second reinforcing layer 5 may be provided. For example, it is also possible to adopt a structure such as the surface layer 3, the base material layer 2, the second reinforcing layer 5, a base material layer 2', the adhesive layer 4, and the reinforcing layer 1 as in the floor finishing material A (floor finishing material A2) in FIG. 2. FIG. 2 shows another embodiment of the floor finishing material of the present invention.

The adhesive layer 4 has an effect of increasing a bonding strength between the reinforcing layer 1 and the base material layer 2. As a method of bonding the reinforcing layer 1 and the base material layer 2, there are a method of stacking each layer and then heating, a method of heating each layer and then embossing while stacking (laminate embossing), a method of stacking the reinforcing layer 1 on a production line on the base material layer 2 which is in a molten state when the base material layer 2 is sheet-molded, and the like, but when the synthetic resin used for the reinforcing layer 1 and the polyvinyl chloride-based resin of the base material layer 2 are not compatible with each other, by providing the adhesive layer 4 compatible with each layer between the reinforcing layer 1 and the base material layer 2, it is possible to prevent peeling from occurring between the reinforcing layer 1 and the base material layer 2.

The adhesive layer 4 is preferably a polymer selected from a group consisting of a copolymerized polyamide, a vinyl chloride-based copolymer, a thermoplastic polyurethane, ethylene vinyl acetate, a copolymerized polyester, and a mixture thereof. For example, when the synthetic resin used in the reinforcing layer 1 is a phenol resin, the adhesive layer 4 made of a vinyl chloride-based copolymer can be suitably used.

A coating amount of the adhesive 4 is not particularly limited, but is preferably from 3 $g/m^2$ to 250 $g/m^2$.

By further providing the second reinforcing layer 5, it is possible to improve the bending rigidity and the dimensional stability. The second reinforcing layer 5 is woven fabric or nonwoven fabric, and is a natural fiber or a synthetic fiber which is an inorganic or organic substance. Preferred examples thereof include fibers selected from a group consisting of glass, carbon, aramid, nylon, polyester, acrylic, vinylon, linen, cotton, hemp, and the like. Among the group, glass, carbon, and the like are more preferable.

A thickness of the second reinforcing layer 5 is not particularly limited, but is preferably 0.03 mm to 0.5 mm.

For example, when the woven fabric is used as the second reinforcing layer 5, as shown in FIG. 2, in the floor finishing material formed by stacking the second reinforcing layer 5 on the base material layer 2', the second reinforcing layer 5 has a shape introduced into the base material layer 2'.

In the floor finishing material, each layer of the base material layer 2 and the surface layer 3 is obtained by mixing predetermined material(s) and molding the mixture with a molding machine such as an extruder or a calendar. The floor finishing material can be obtained by stacking each layer and the reinforcing layer 1, if necessary, together with the adhesive layer 4 provided on the reinforcing layer 1 and performing a heat treatment. In addition, the floor finishing material can also be obtained by molding and stacking each layer at once using a multi-layer extruder.

The adhesive layer 4 can be prepared by applying the adhesive layer 4 to the reinforcing layer 1 by dipping, bar coating, gravure coating, reverse coating, die coating, or the like, and performing a heat treatment in a drying furnace or the like.

In addition, the floor finishing material can be obtained through a process of printing a design, applying wrings to the surface layer, and applying pressure after heating for stacking each layer.

The second reinforcing layer 5 may be disposed between layers of the base material layer 2 and the base material layer 2' as shown in FIG. 2, and may be disposed between layers of the base material layer 2 and the surface layer 3, but it is preferable that the second reinforcing layer 5 is disposed between the base material layer 2 and the base material layer 2' because a ruggedness shape on a surface of the second reinforcing layer 5 does not easily affect the surface of the surface layer 3 (the surface on the side opposite to the side of the base material layer 2). When the second reinforcing layer 5 is provided, the floor finishing material can be obtained by disposing the second reinforcing layer 5 at a desired position, such as between layers of the base material layer 2 and the base material layer 2', and performing a heat treatment or the like. In addition, the floor finishing material can also be obtained by molding and stacking each layer at once using a multi-layer extruder. Thereafter, the floor finishing material can be obtained through a process of applying pressure after the heating above.

In order to improve adhesion between the reinforcing layer 1 and the base material layer 2, an adhesive layer 4 may be provided, and if necessary, the adhesive layer 4 may be also provided between the second reinforcing layer 5 and another layer. However, if the adhesion between the second reinforcing layer 5 and another layer is sufficient, a case that these are not applied enables to be easier to manufacture a product.

EXAMPLE

Hereinafter, the present invention will be described in detail with reference to Examples. However, the present invention is not limited to the following Examples.

Materials used in Examples and Comparative Examples are as follows.

Polyvinyl chloride-based resin: Polyvinyl chloride, degree of polymerization: 1000

Phthalic acid ester-based plasticizer: DOP (dioctyl phthalate)

Polyester-based plasticizer: Adipic acid-based polyester plasticizer, viscosity (25° C.): 150 mPa·s Phosphoric acid ester-based plasticizer: TCP (tricresyl phosphate)

Stabilizer: Barium zinc-based stabilizer

Filler: Light calcium carbonate

Flame retardant: Mixture of zinc hydroxystannate and a molybdic acid compound (mixing ratio: 3:2 (weight ratio))

Backing material: Polyester woven fabric

Adhesive: vinyl chloride-based copolymer (vinyl chloride-vinyl acetate copolymer) emulsion The reinforcing layers in Examples 1, 2, and 6 and Comparative Examples 1 to 5 are as follows.

Reinforcing layer: Phenol resin impregnated glass woven fabric (plain weave), thickness: 0.3 mm Yarn used, tex: 135 (g/1000 m)

Weaving density: warp: 19 yarns/25 mm·weft: 21 yarns/25 mm

Impregnation amount of resin: 40 $g/m^2$

The second reinforcing layer in Example 6 is as follows.

Second reinforcing layer: Glass woven fabric (leno weave): thickness 0.1 mm

Yarn used tex warp 34 (g/1000 m)·weft 69 (g/1000 m)

Weaving density warp: 10×2 yarns/25 mm·weft 10 yarns/25 mm

Examples 1 and 6 and Comparative Examples 1 to 3

<Sheet Manufacturing Method>

Blending materials for the surface layer and the base material layer were kneaded based on formulations shown in Table 1, and a sheet for each layer was prepared using the obtained compound and two rolls at 175° C. An adhesive was applied to one side of the reinforcing layer used in Examples by bar coating, and then heated and dried at 140° C. for 30 seconds to form an adhesive layer. Then, obtained layers were stacked and pressed at 170° C. to obtain the floor finishing material shown in Table 1. Here, ones having a backing material were stacked in an order of the backing material/base material layer/surface layer from a bottom, and ones having a reinforcing layer were stacked in an order of the reinforcing layer/adhesive layer/base material layer/surface layer from a bottom. Ones having a second reinforcing layer were stacked in an order of the reinforcing layer/adhesive layer/base material layer (lower)/second reinforcing layer/base material layer (upper)/surface layer from a bottom.

<Measurement of Weight>

As for the weight in the present specification, a weight of a 10 cm square sample was measured using an electronic balance, and the obtained value was converted to calculate the weight per 1 $m^2$ ($g/m^2$).

<Measurement of Bending Rigidity (Bending Stiffness)>

The bending rigidity in the present specification was measured in accordance with a test method specified in JIS K7106. Specifically, when fixing one end of the floor finishing material to a chuck and bending to a predetermined bending angle, the bending rigidity was obtained base on a bending moment applied to the other and a bending angle.

Table 2, and a sheet for each layer was prepared using the obtained compound and two rolls at 175° C. An adhesive was applied to one side of the reinforcing layer used in Examples by bar coating, and then heated and dried at 140° C. for 30 seconds to form an adhesive layer. Then, obtained layers were stacked and pressed at 170° C. to obtain the floor finishing material shown in Table 2. Here, ones having a reinforcing layer were stacked in an order of the reinforcing layer/adhesive layer/base material layer/surface layer from a bottom.

<Measurement of Amount of Smoke>

The amount of smoke in the present specification is based on a test method specified in ASTM E662, and the amount of smoke generated in the flame combustion and the non-flame combustion was measured. Specifically, a sample was placed in a closed chamber and burned for 4 minutes with an electro-thermal heater and a gas burner (flame combustion only). A light attenuation coefficient was obtained from an intensity of transmitted light from a phototube during combustion, a specific optical density when the light attenuation coefficient was a largest value was calculated, and the amount of smoke (Ds (max)) was calculated based on this value.

TABLE 1

| | | Comparative Example 1 | Comparative Example 2 | Comparative Example 3 | Example 1 | Example 6 |
|---|---|---|---|---|---|---|
| Thickness of surface layer (mm) | | 0.5 | 0.5 | 0.15 | 0.15 | 0.15 |
| Thickness of base material layer (mm)* | | 2.0 | 2.0 | 0.85 | 0.85 | Upper 0.45<br>Lower 0.40 |
| Backing material (mm) | | — | 0.1 | — | — | — |
| Reinforcing layer (mm) | | — | — | — | 0.3 | 0.3 |
| Surface layer | Polyvinyl chloride-based resin (parts by weight) | 100 | 100 | 100 | 100 | 100 |
| | Polyester-based plasticizer (parts by weight) | 35 | 35 | 35 | 35 | 35 |
| | Stabilizer (parts by weight) | 3 | 3 | 3 | 3 | 3 |
| Base material layer | Polyvinyl chloride-based resin (parts by weight) | 100 | 100 | 100 | 100 | 100 |
| | Polyester-based plasticizer (parts by weight) | 44 | 44 | 44 | 44 | 44 |
| | Stabilizer (parts by weight) | 3 | 3 | 3 | 3 | 3 |
| | Filler (parts by weight) | 50 | 50 | 50 | 50 | 50 |
| | Flame retardant (parts by weight) | 50 | 50 | 50 | 50 | 50 |
| Weight ($g/m^2$) | | 3900 | 3950 | 1700 | 2000 | 2050 |
| Bending rigidity (MPa) | | 39 | 44 | 16 | 217 | 217 |

*The base material layer of Example 6 is composed of two layers of an upper layer and a lower layer, the lower layer has a thickness including the second reinforcing layer (stack when preparing a sheet).

As is clear from Table 1, in Examples 1 and 6, even though the thickness of the floor finishing material was thinner compared with Comparative Examples 1 to 3 in which the reinforcing layer was not provided, a value of the bending rigidity was large and sufficient rigidity was exhibited. In a case where as in Comparative Examples 1 and 2, the floor finishing material is thick, the weight becomes large, which is not preferable. In Comparative Example 2, a polyester woven fabric was used as a backing material instead of a reinforcing layer, but the value of the bending rigidity was not significantly improved. Further, it was confirmed that a significant difference in the value of the bending rigidity was observed depending on presence or absence of the reinforcing layer (phenol resin impregnated glass woven fabric in the present Example).

Example 2 and Comparative Examples 4 and 5

<Sheet Manufacturing Method>

Blending materials for the surface layer and the base material layer were kneaded based on formulations shown in <Measurement of Amount of Hydrogen Chloride Gas>

An amount of hydrogen chloride gas in the present specification is based on a test method specified in ASTM E662, and an amount of smoke generated in the flame combustion and the non-flame combustion was measured. Specifically, a sample was placed in a closed chamber and burned for 4 minutes with an electro-thermal heater and a gas burner (flame combustion only). At the end of a test, 100 cc of air in the chamber was passed through a detector tube to measure a concentration of the toxic gas (hydrogen chloride gas) (HCl (ppm)).

TABLE 2

| | Comparative Example 4 | Comparative Example 5 | Example 2 |
|---|---|---|---|
| Thickness of surface layer (mm) | 0.15 | 0.15 | 0.15 |
| Thickness of base material layer (mm) | 0.85 | 0.85 | 0.85 |
| Reinforcing layer (mm) | — | — | 0.3 |

TABLE 2-continued

| | | Comparative Example 4 | Comparative Example 5 | Example 2 |
|---|---|---|---|---|
| Surface layer | Polyvinyl chloride-based resin (parts by weight) | 100 | 100 | 100 |
| | Phthalic acid ester-based plasticizer (parts by weight) | 35 | — | — |
| | Polyester-based plasticizer (parts by weight) | — | 35 | 35 |
| | Stabilizer (parts by weight) | 3 | 3 | 3 |
| Base material layer | Polyvinyl chloride-based resin (parts by weight) | 100 | 100 | 100 |
| | Phthalic acid ester-based plasticizer (parts by weight) | 44 | — | — |
| | Polyester-based plasticizer (parts by weight) | — | 34 | 34 |
| | Phosphoric acid ester-based plasticizer (parts by weight) | — | 10 | 10 |
| | Stabilizer (parts by weight) | 3 | 3 | 3 |
| | Filler (parts by weight) | 100 | 50 | 50 |
| | Flame retardant (parts by weight) | — | 50 | 50 |
| Weight ($g/m^2$) | | 1700 | 1700 | 2000 |
| Bending rigidity (MPa) | | 16 | 16 | 217 |
| Flame combustion smoke test (Ds (max)) | | 280 | 100 | 80 |
| Non-flame combustion smoke test (Ds (max)) | | 250 | 120 | 120 |
| Flame combustion toxic gas test (HCl (ppm)) | | 250 | 100 | 90 |
| Non-flame combustion toxic gas test (HCl (ppm)) | | 200 | 60 | 60 |

As is clear from Table 2, it was confirmed that the amount of smoke and the amount of hydrogen chloride gas can be significantly reduced by using the polyester-based plasticizer, the phosphoric acid ester-based plasticizer, and the flame retardant, and that a use of the reinforcing layer has almost no effect on the amount of smoke and the amount of hydrogen chloride gas.

Examples 3 to 5

<Sheet Manufacturing Method>

A sheet was produced in a similar manner as in Example 2 above except that the following reinforcing layers (1) to (3) having a different weaving density from each other were used as the reinforcing layer.

Reinforcing layers (1) to (3): Phenol resin impregnated glass woven fabric (plain weave), thickness: 0.3 mm Yarn used, tex: 135 (g/1000 m) . . . common to (1) to (3)

Weaving density (1) warp: 19 yarns/25 mm weft 18 yarns/25 mm (2) warp: 19 yarns/25 mm·weft 21 yarns/25 mm (3) warp: 25 yarns/25 mm·weft 25 yarns/25 mm Impregnation amount of resin: 40 $g/m^2$ . . . common to (1) to (3)

<Measurement of Peeling Strength in 90° Peeling Test>

The reinforcing layer is peeled from the base material layer from an end of a sheet sample having a width of 25 mm and a length of 200 mm to prepare a grip portion of the reinforcing layer having a length of 50 mm.

An obtained sheet sample was fixed to a jig for 90° peeling test of a shopper type tensile tester (model: TS-1563, manufactured by Ueshima Seisakusho Co., Ltd.) in standard states (23±2° C., relative humidity 50±10%), and the grip portion of the reinforcing layer above was sandwiched between chucks and pulled at a load capacity of 100 N and a tensile speed of 200 mm/min, and a peeling strength was measured.

<Measurementof Flexibility>

Flexibility in the present specification was measured in accordance with a flexibility test method specified in JIS A1454. Specifically, in standard state (23±2° C., relative humidity: 50±10%), when the floor finishing material was wound around mandrels with diameters of 0100 mm, 90 mm, 80 mm, 70 mm, 60 mm, 50 mm, 40 mm, and 30 mm in this order with a reinforcing layer surface inside, it was confirmed whether the reinforcing layer was cracked or peeled off from the base material layer. Numerical values in Table 3 show a minimum diameter at which cracking and peeling do not occur.

TABLE 3

| | Example 3 | Example 4 | Example 5 |
|---|---|---|---|
| Reinforcing layer used | (1) | (2) | (3) |
| Weight ($g/m^2$) | 1970 | 2000 | 2080 |
| Bending rigidity (mPa) | 204 | 217 | 249 |
| Peeling strength between layers (N/25 mm) | Breakage of reinforcing layer (35) | 60 | 45 |
| Flexibility (mm) | <30 (No cracking, no peeling) | <30 (No cracking, no peeling) | 70 |

In the 90° peeling test, in Example 3, the reinforcing layer is broken before the reinforcing layer and the base material layer are peeled off, but a strength between the layers is sufficient. In Examples 4 and 5, the reinforcing layer and the base material layer are peeled without breakage of the reinforcing layer, and peeling strengths between the reinforcing layer and the base material layer are 60 N/25 mm and 45 N/25 mm, which are sufficient strength of the reinforcing layer and sufficient strength between layers. In the measurement of flexibility, in Example 5, the reinforcing layer cracked when wound around a mandrel having a diameter of Φ60 mm. In Examples 3 and 4, even with a mandrel having a diameter of Φ30 mm, the reinforcing layer is not cracked or peeled off, and the flexibility is excellent. Thus, it was confirmed that the strength and flexibility of the floor finishing material differed depending on a degree of weaving density (aperture) of the reinforcing layer.

INDUSTRIAL APPLICABILITY

According to the present invention, it is possible to provide a floor finishing material which is rigid enough to withstand impact and deformation, is lightweight, and can be easily manufactured.

Although the present invention has been described in detail with reference to a specific embodiment, it will be apparent to those skilled in the art that various changes and modifications can be made without departing from the spirit and the scope of the present invention.

The present application is based on a Japanese Patent Application (Japanese Patent Application No. 2019-048289) filed on Mar. 15, 2019, and the content thereof is incorporated herein as reference.

REFERENCE SIGNS LIST

A floor finishing material
1 reinforcing layer
2, 2' base material layer
3 surface layer

4 adhesive layer
5 second reinforcing layer

The invention claimed is:

1. A floor finishing material, comprising:

a first reinforcing layer;

a base material layer over the first reinforcing layer;

a second reinforcing layer over the base material layer; and a surface layer over the second reinforcing layer, wherein the first reinforcing layer is an outermost layer of the floor finishing material and contains:

a woven fabric or nonwoven fabric; and a thermosetting synthetic resin selected from the group consisting of a phenol resin and an epoxy resin so that the woven fabric or nonwoven fabric is impregnated with the thermosetting synthetic resin, wherein the second reinforcing layer is made of a woven or nonwoven fabric which is not impregnated with any synthetic resin, and wherein the base material layer and the surface layer contain a polyvinyl chloride-based resin composition.

2. The floor finishing material according to claim 1, having a bending rigidity as measured in accordance with JIS K7106 of 50 MPa or more.

3. The floor finishing material according to claim 1, having a weight of 1000 $g/m^2$ or more and 2300 $g/m^2$ or less.

4. The floor finishing material according to claim 1, wherein the base material layer and the surface layer contain a plasticizer.

5. The floor finishing material according to claim 4, wherein the plasticizer is a polyester-based plasticizer.

6. The floor finishing material according to claim 1, wherein a result of a combustion smoke test (Ds (max)) as measured in accordance with ASTM E662 is 200 or less, and a result of a combustion toxic gas test (HCl (ppm)) as measured in accordance with ASTM E662 is 150 or less.

7. The floor finishing material according to claim 1, wherein the first reinforcing layer contains the woven fabric impregnated with the phenol resin.

8. The floor finishing material according to claim 7, wherein the woven fabric contains glass or carbon.

9. The floor finishing material according to claim 7, wherein a tex of a yarn used for the woven fabric is 30 g/1000 m to 300 g/1000 m, and a weaving density of the woven fabric is 10 yarns/25 mm to 30 yarns/25 mm.

10. The floor finishing material according to claim 1, wherein an impregnation amount of the thermosetting synthetic resin in the first reinforcing layer is 20 $g/m^2$ to 60 $g/m^2$.

11. The floor finishing material according to claim 1, wherein the surface layer has a design imparted by coloring the polyvinyl chloride-based resin composition or by forming an embossed surface.

12. The floor finishing material according to claim 1, further comprising, between the second reinforcing layer and the surface layer, another base material layer containing a polyvinyl chloride-based resin composition.

13. The floor finishing material according to claim 12, wherein the surface layer is transparent and a decorative pattern is printed on a surface of the surface layer adjacent to the another base material layer or on a surface of the another base material layer adjacent to the surface layer.

* * * * *